United States Patent [19]
Bruning

[11] Patent Number: 5,585,151
[45] Date of Patent: Dec. 17, 1996

[54] ANTI-THEFT ORNAMENT REMOVAL APPARATUS

[76] Inventor: Everett Bruning, 732 Meeker, Longmont, Colo. 80501

[21] Appl. No.: 512,172

[22] Filed: Aug. 7, 1995

[51] Int. Cl.$^6$ .................................................. B60R 13/00
[52] U.S. Cl. .............................. 428/31; 40/591; 280/727
[58] Field of Search .................................. 428/31; 40/591; 280/727; D12/197

[56] References Cited

U.S. PATENT DOCUMENTS

| | | | |
|---|---|---|---|
| D. 320,188 | 9/1991 | Rice, Jr. et al. | D12/197 |
| 4,349,591 | 9/1982 | Kanamori | 428/31 |
| 4,560,597 | 12/1985 | Kanamori | 428/31 |
| 4,913,941 | 4/1990 | Tedrahn | 428/31 |
| 5,002,810 | 3/1991 | Birdwell et al. | 428/31 |
| 5,052,714 | 10/1991 | Muscat et al. | 280/762 |
| 5,262,210 | 11/1993 | Sellers et al. | 428/31 |
| 5,316,803 | 5/1994 | Prunty | 428/31 |

Primary Examiner—Alexander Thomas

[57] ABSTRACT

An anti-theft ornament apparatus allowing a hood ornament to be either spring mounted or securely fastened to the hood and allowing the ornament to be easily removed and remounted to the hood is disclosed. A tubular housing is attached to the ornament mounting base. A sliding disk that slides up and down within the housing is attached by a connecting rod to the ornament mounting loop. A spring surrounding the connecting rod keeps the ornament in place on the ornament base through spring tension in normal use. When the ornament is removed a disk magnet above the sliding disk serves to actuate a magnetic locking arm to hold the connecting rod and sliding disk in a raised position. When the ornament is replaced an upward movement disengages the locking arm, allowing the ornament and sliding disk to return to the lower ornament mounted position. A locking plunger will firmly secure the ornament in the mounted position. An electrical circuit can activate the vehicle horn or an alarm when an attempt is made to remove the ornament.

18 Claims, 3 Drawing Sheets

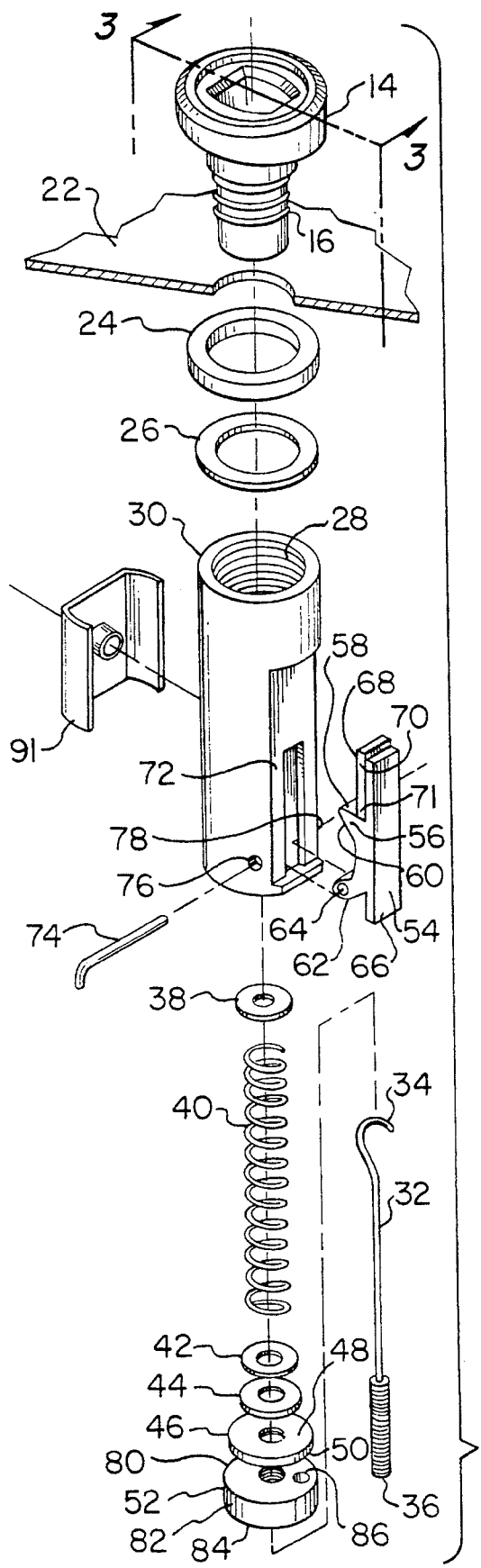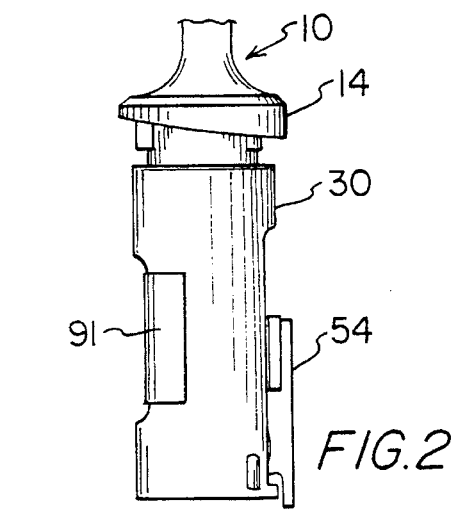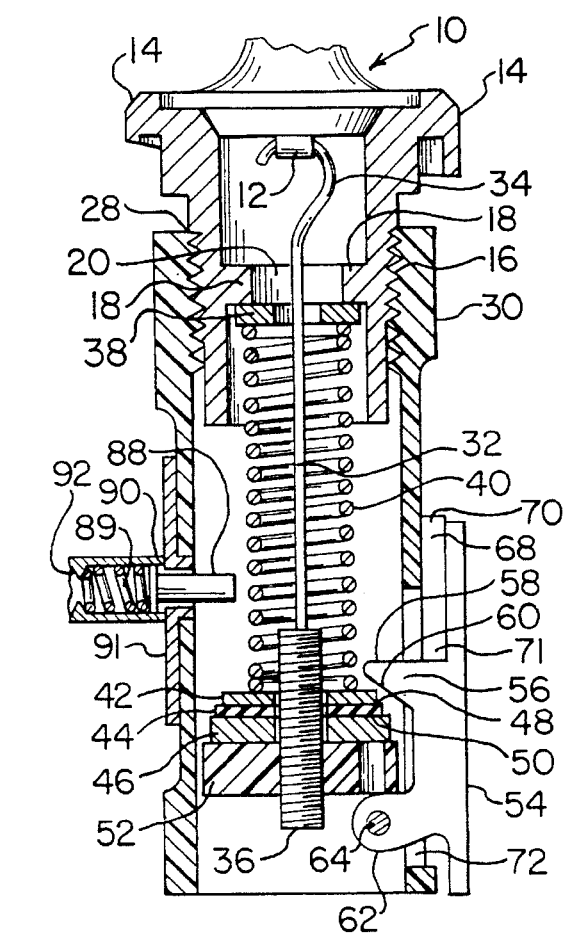
FIG. 2
FIG. 3
FIG. 1

ANTI-THEFT ORNAMENT REMOVAL APPARATUS

BACKGROUND OF THE INVENTION

1. Field of the Invention

The present invention relates to mounting devices for ornaments of vehicles. More particularly, the invention relates to mounting devices designed to prevent the theft of hood ornaments.

2. Background Information

Ornaments are typically fastened via a spring arrangement to the front hood or front clip of the vehicle. In recent years hood ornaments have become a target for theft and vandalism, with "luxury car" hood ornaments being a favorite target for theft. The cost of replacing these hood ornaments can range up to several hundred dollars. The industry has failed to provide a satisfactory solution to the growing theft and vandalism problem.

Original equipment hood ornaments are typically mounted to a base by a wire clip passing through a mounting loop on the hood ornament. A spring surrounds the wire clip, with the base engaging the top of the spring. The bottom end of the clip engages the bottom of the spring. This spring arrangement allows the hood ornament to be deflected should it strike a person or object. The spring arrangement returns the ornament to the original upright position. However, this arrangement also allows the hood ornament to be pulled upward from the mounting base, allowing the wire clip to be cut and the hood ornament to be quickly stolen.

U.S. Pat. No. 5,316,803 discloses a guarded vehicle hood ornament. The ornament is connected to a cotter pin in a steel protective sleeve with a spring surrounding the protective sleeve. The upper end of the pin and sleeve are heat treated to harden them and improve resistance to cutting. The upper end of the pin and sleeve can be exposed by an upward pull and cut by a hacksaw or small bolt cutters, thus still leaving the ornament vulnerable to theft or vandalism.

U.S. Pat. No. 4,913,941 discloses a removable car hood ornament apparatus allowing a detachable ornament to be removed and replaced. However, the ornament uses a non-standard shaft member and the device is, therefore, not suitable for use with original equipment hood ornaments.

U.S. Pat. No. 5,262,210 discloses a quick release vehicular hood ornament. This device also utilizes an ornament with a non-standard base and is, therefore, not suitable for use with original equipment hood ornaments.

U.S. Pat. No. 5,052,714 discloses a hood ornament retraction device for retracting the ornament below the hood of the vehicles. However, the device is mechanically and electronically complex and thus expensive to install and susceptible to breakdown.

Accordingly, there is a need for a new and improved anti-theft ornament mounting device which is inexpensive, easy to use, reliable, and which can be either used with existing hood ornaments or installed as original equipment on new vehicles.

SUMMARY OF THE INVENTION

In view of the foregoing disadvantages inherent in the known types of hood ornament mounting structures, the present invention provides an improved anti-theft ornament mounting apparatus. The apparatus allows an original equipment hood ornament to be either spring mounted or firmly fastened to the hood while enabling the vehicle owner to quickly and easily remove the hood ornament to prevent theft or vandalism when the vehicle is not in use. A circuit triggers the vehicle horn or an alarm when unauthorized removal of the hood ornament is attempted.

Accordingly, it is an object of the present invention to provide an anti-theft ornament mounting apparatus allowing an ornament to be quickly removed from and quickly fastened to the hood of a vehicle.

It is another object of the invention to provide an anti-theft apparatus which allows an ornament to be either spring mounted or firmly secured in place.

It is another object of the invention to provide an anti-theft apparatus which can be easily installed for use with existing original equipment hood ornaments.

It is another object of the invention to provide an anti-theft apparatus suitable for use on new vehicles.

It is another object of the invention to provide an anti-theft apparatus which can trigger the vehicle horn or an alarm device when the hood ornament is raised.

It is another object of the invention to provide an anti-theft apparatus which is both durable and reliable in operation.

It is another object of the invention to provide an anti-theft apparatus which may economically manufactured with regard to both materials and labor.

A housing that is attached to the hood ornament base contains a sliding disk that slides up and down within the housing. The sliding disk is connected by a hooked wire or rod to the hood ornament mounting loop. A spring surrounding the wire or rod keeps the hood ornament in place on the ornament base in normal use. A round magnet above the sliding disk serves to engage a magnetically actuated locking arm when the ornament is removed to hold the hooked wire or rod and base member in a raised position. When the ornament is replaced on the hooked wire or rod, a slight upward movement causes the magnetically actuated locking arm to be repelled, allowing the sliding disk to return to the lower ornament mounted position when the ornament is replaced on the ornament base. The ornament is firmly secured by a locking plunger when the vehicle engine is not running. The anti-theft apparatus will activate the horn or other alarm device if the hood ornament is raised when the motor is turned off.

The anti-theft ornament system has been found to achieve these objects and advantages. Other objects and advantages of this invention will become apparent from the following description and appended claims, reference being had to the accompanying drawings forming a part of this specification wherein like reference characters designate corresponding parts in the several views.

BRIEF DESCRIPTION OF THE DRAWINGS

The invention, together with further objects, features, and advantages will become more apparent and may be best understood by reference to the following description taken in conjunction with the accompanying drawings, in which:

FIG. 1 is an exploded view of the first preferred embodiment of the anti-theft ornament apparatus.

FIG. 2 is a front plan view of the first preferred embodiment of the anti-theft ornament apparatus.

FIG. 3 is a front cross-sectional view of the first preferred embodiment of the anti-theft ornament apparatus taken along line 3—3 of FIG. 1 showing the ornament in the mounted position.

Figure 4:
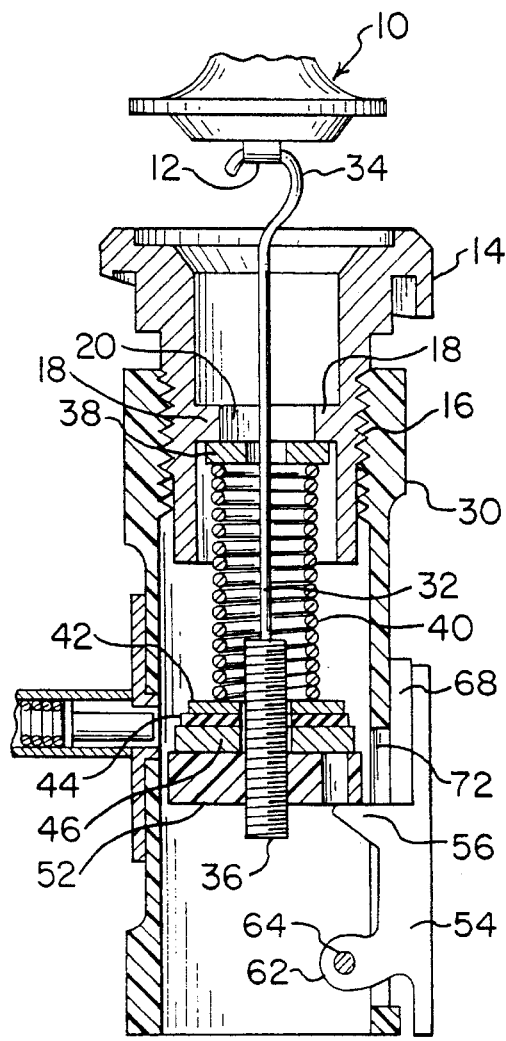
FIG. 4 is a front cross-sectional view of the first preferred embodiment of the anti-theft ornament apparatus taken along line 3—3 of FIG. 1 showing the apparatus in the ornament removal position.

Before explaining the disclosed embodiments of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENTS

Although the present invention has been described with reference to preferred embodiments, numerous modifications and variations can be made and still the result will come within the scope of the invention. No limitation with respect to the specific embodiments disclosed herein is intended or should be inferred.

Referring first to FIGS. 1–5, a hood ornament 10 having a mounting loop 12 fits on an ornament base 14. The ornament base 14 has a lower threaded portion 16 which contains a plate 18 having an aperture 20. The lower threaded portion 16 extends through the vehicle hood 22, a rubber washer 24, and a metal washer 26. These items are typical original equipment on automobiles.

The lower threaded portion 16 screws into the circular threaded opening 28 of tubular housing 30. Other means for attaching a tubular housing 30 to an ornament base 14 are known in the art and could be utilized (by way of example, a groove and clip, twist lugs, complementary notches and protrusions, and pin and keyhole, not shown).

A connecting rod 32 has a hook 34 at the upper end and a threaded insert 36 at the lower end. The connecting rod 32 may be formed from a wire soldered to a threaded portion (as shown). Alternatively, a one piece rod having a hooked upper end and a threaded lower end (not shown) may be utilized. The connecting rod 32 extends through a centering washer 38, a pressure spring 40, a protective washer 42, a rubber washer 44, and a disk magnet 46. Disk magnet 46 has an upper (+) north pole face 48 and a lower (−) south pole face 50. The threaded insert 36 threads into the sliding disk 52.

Ferromagnetic lever 54 has a locking arm 56 with a flat upper face 58 and a curved lower face 60, a hinge pin mount 62 having a hinge pin aperture 64, and a stop 66. A lever magnet 68 having an upper (−) south pole 70 and a lower (+) north pole 71 is attached to the upper end of ferromagnetic lever 54. Ferromagnetic lever 54 fits into the elongated aperture 72 of tubular housing 30 and is secured to the tubular housing 30 by means of a hinge pin 74 which passes through hinge pin mount 76, hinge pin aperture 64, and hinge pin mount 78.

Tubular housing 30 is made of a strong, nonmagnetic material able to withstand temperatures found under a vehicle hood. Suitable materials include polymers with sufficient strength and sufficiently high melting point such as polyvinyl chloride (PVC), or nylon. Disk magnet 46 and lever magnet 68 are preferably ceramic or rare-earth magnets, which are strong types off magnets. Sliding disk 52 is preferably a polymer such as nylon or a nonmagnetic metal such as brass or aluminum. Ferromagnetic lever 54 is preferably made of a ferromagnetic material (one strongly attracted to a magnetic field) such as iron, nickel, or suitable steel alloys.

With the hood ornament 10 mounted in place (FIG. 3), the sliding disk 52 is at the lower end of tubular housing 30, with pressure spring 40 applying tension pressure which keeps the hood ornament 10 secured to the ornament base 14 by the hook 34 pulling on mounting loop 12. The sliding disk 52 is kept at the lower end of tubular housing 30 by the tension pressure that pressure spring 40 exerts on the protective washer 42, the pressure being transmitted also to the rubber washer 44, the disk magnet 46, and the sliding disk 52. The downward movement of sliding disk 52 is limited as the sliding disk 52 abuts the hinge pin mount 62 of ferromagnetic lever 54. The ferromagnetic lever 54 is attracted toward the tubular housing 30 by the magnetic field of disk magnet 46. In this position, turning the connecting rod 32 merely rotates the sliding disk 52, as the pressure spring 40 does not exert enough tension in this extended position to keep the sliding disk 52 from rotating.

When it is desired to remove the hood ornament 10, the hood ornament 10 is pulled upward against the tension of pressure spring 40. This causes the connecting rod 32 to raise the sliding disk 52 (and also the disk magnet 46, the rubber washer 44, and the protective washer 42). As the sliding disk 52 is raised, first the upper outer edge 80 and then the outer edge 82 of sliding disk 52 contacts the curved lower face 60 of locking arm 56, causing the ferromagnetic lever 54 to pivot away from the tubular housing 30. The curved lower face 60 remains in contact with the sliding disk 52 at all times due to the magnetic attraction between the disk magnet 46 and the ferromagnetic lever 54 (depending on the exact dimensions utilized, the protective washer 42 or the disk magnet 46 may also contact the curved lower face 60). As the edge 82 and the lower outer edge 84 rise above the flat upper face 58 of locking arm 56, the central portion of lever magnet 68 is strongly attracted to the edge of disk magnet 46 (disk magnet 46 having a (+) pole on top and a (−) pole on the bottom, while lever magnet 68 has a (−) pole on top and a (+) pole on the bottom). As a result the ferromagnetic lever 54 pivots to the position adjacent the tubular housing 30. The upward pull on hood ornament 10 is then released, and the sliding disk 52 is held in place on the flat upper face 58 of locking arm 56 due to the tension exerted by compressed pressure spring 40 (FIG. 4). This tension and the friction between components is sufficient that the distance from the sliding disk 52 to the hook 34 can be adjusted by rotating the connecting sod 32, causing the threaded insert 36 to be threaded more or less deeply into the sliding disk 52. Sliding disk 52 is provided with a retaining aperture 86 into which a thin rod (not shown) can be inserted to hold the sliding disk 52 in place for adjustment if sliding disk 52 should rotate due to the presence of oil or wear on components. Retaining aperture 86 also allows the sliding disk 52 to be held in place and the distance from the sliding disk 52 to the hook 34 adjusted while sliding disk 52 is in the lower, ornament mounted position shown in FIG. 3.

With the sliding disk member 52 secured in place, the hood ornament 10 can be removed and thereby protected against theft and vandalism by unhooking mounting loop 12 from the hook 34.

Figure 5:
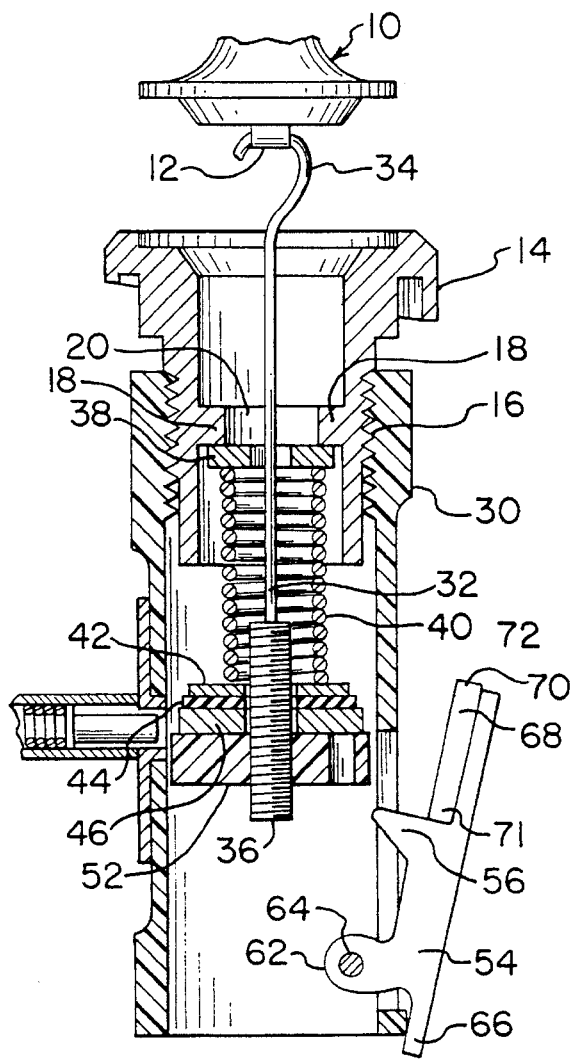
FIG. 5 is a front cross-sectional view of the first preferred embodiment of the anti-theft ornament apparatus taken along line 3—3 of FIG. 1 showing the apparatus in the locking arm released position.

To replace the hood ornament 10, the mounting loop 12 is placed over the hook 34 and the hood ornament 10 is used to pull up on the connecting rod 32. As the lower (−) south pole face 50 of disk magnet 46 rises to the level of the upper (−) south pole 70 of lever magnet 68, the magnetic repulsion (acting through the polymeric tubular housing 30) causes the ferromagnetic lever 54 to pivot and rotate away from the tubular housing 30 until the stop 66 contacts the tubular housing 30 (FIG. 5). The upward pull on the hood ornament 10 is then released, and the hood ornament 10 is moved rapidly downward (this downward movement is aided by pressure spring 40). This causes the sliding disk 52 to move past the flat upper face 58 of locking arm 56 before the locking arm can engage the sliding disk 52. The hood ornament 10 is then returned to the normal mounted position (FIG. 3).

When the vehicle motor is not running, the hood ornament 10 is locked firmly into place by the metal locking plunger 88 contained in perpendicular tube 90, which is pushed into the locking position by light spring 89, thereby preventing the protective washer 42, the rubber washer 44, the disk magnet 46, and the sliding disk 52 from rising within the cylinder housing 30. Perpendicular tube 90 is mounted on a metal collar 91. An engine vacuum line (not shown) is connected to the perpendicular tube 90. When the motor is running, the engine vacuum will retract metal locking plunger 88 (the vacuum being sufficient to overcome the pressure of light spring 89), thereby allowing the hood ornament 10 to be removed only when the engine is running. A spring stop 92 within the perpendicular tube 90 prevents the vacuum from sucking the light spring 89 and the metal locking plunger 88 into the vacuum line.

At times it may be desirable to leave the hood ornament 10 in place and have a circuit that triggers the vehicle horn or an alarm if an attempt is made to remove the hood ornament 10. This is accomplished by connecting the metal collar 91 to the horn or alarm. If the hood ornament 10 is raised, the protective washer 42 or disk magnet 46 will contact the metal locking plunger 88 and will complete a ground circuit to the car (via the connecting rod 32 and/or the pressure spring 40 through the centering washer 38 to the ornament base 14 and the vehicle hood 22).

Figure 6:
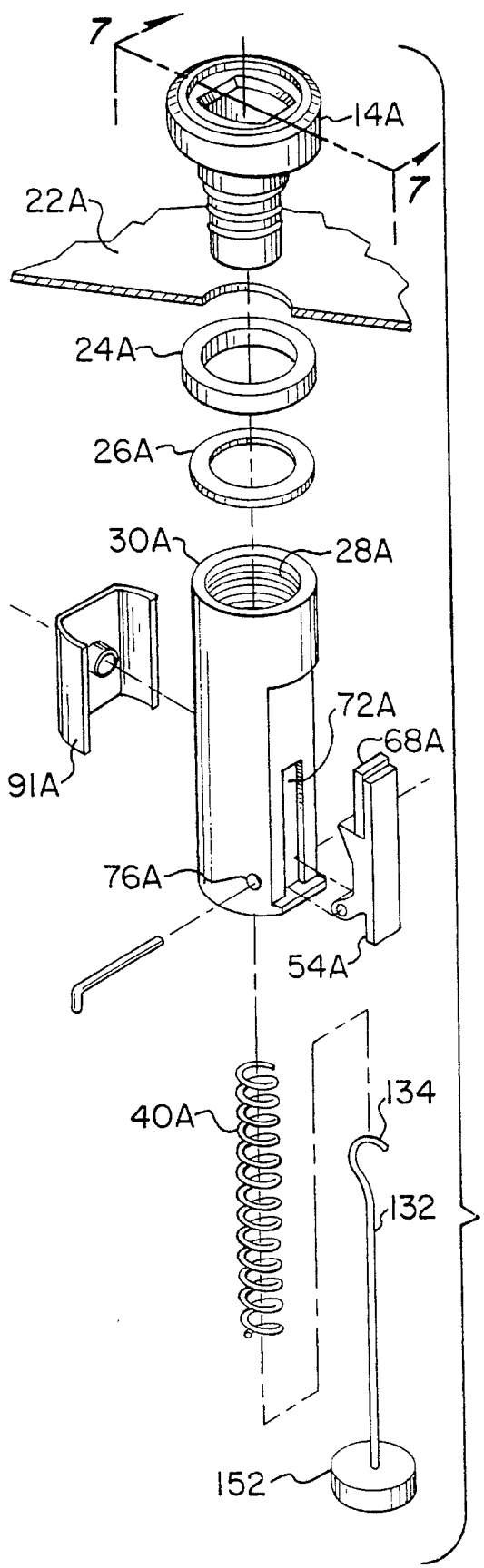
FIG. 6 is an exploded view of an alternate preferred embodiment of the anti-theft ornament apparatus.
Figure 7:
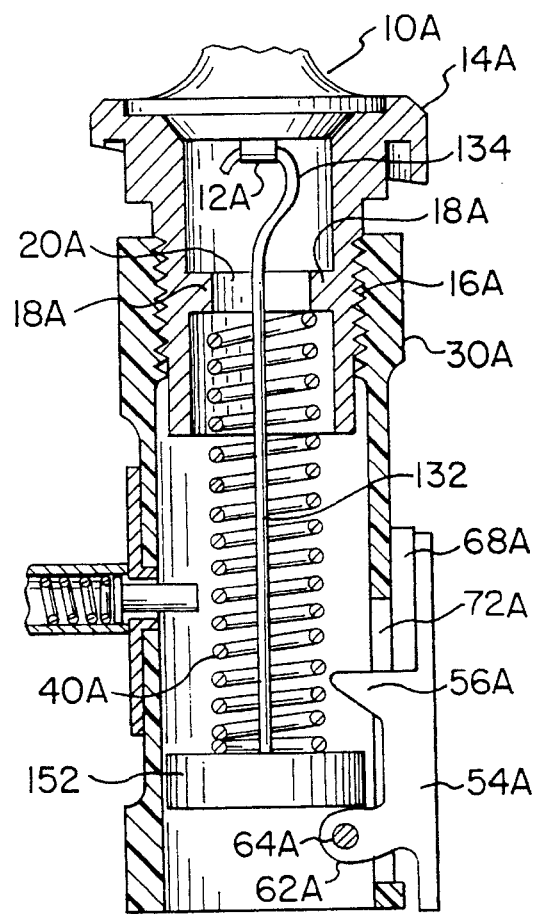
FIG. 7 is a front cross-sectional view of an alternate preferred embodiment of the anti-theft ornament apparatus taken along line 7—7 of FIG. 6 showing the ornament in the mounted position.

The preferred embodiment illustrated in FIGS. 1–5 are particularly adapted for use with the variety of existing vehicles and hood ornaments. Referring next to FIGS. 6–7, a simplified embodiment is illustrated for use with a particular vehicle and hood ornament of known construction in which similar parts are identified with similar numbers with the suffix "A", and a number of the previously illustrated parts are eliminated. Since many original equipment hood ornament bases have a plate 18A with an aperture 20A to guide the original equipment wire clip or rod, the centering washer 38 (FIG. 1) may be eliminated. An anti-theft ornament mounting apparatus designed for use on a specific vehicle could also use a connecting rod of standardized length, enabling the protective washer 42, the rubber washer 44, and the threaded insert 36 (FIG. 1) to be eliminated. A standardized length connecting rod also allows the hook 134 and the connecting rod 132 to be fastened to the sliding disk 152 (FIG. 6) by any of the many known means for connecting (for example, the base of the connecting rod may be glued or epoxied into place, or the sliding disk may be molded around the base of the connecting rod). The function and operation of this preferred embodiment illustrated in FIGS. 6–7 is in all ways similar to the preferred embodiment illustrated in FIGS. 1–5 and described above.

Many and varied minor modifications of the basic invention will be apparent to those skilled in the art and will still fall within the scope of the invention. By way of example, but not of limitation, the upper end of the housing may be adapted to fit any type of ornament base, the opposite poles of the magnets may be utilized in a similar manner, connecting rods of various designs could be utilized, or the shape of the housing and components may be varied.

It should be understood the foregoing detailed description is for purposes of illustration rather than limitation of the scope of protection accorded this invention, and therefore the description should be considered illustrative, not exhaustive. The scope of protection is to be measured as broadly as the invention permits. While the invention has been described in connection with preferred embodiments, it will be understood that there is no intention to limit the invention to those embodiments. On the contrary, it will be appreciated that those skilled in the art, upon attaining an understanding of the invention, may readily conceive of alterations to, modifications of, and equivalents to the preferred embodiments without departing from the principles of the invention, and it is intended to cover all these alternatives, modifications and equivalents. Accordingly, the scope of the present invention should be assessed as that of the appended claims and any equivalents falling within the true spirit and scope of the invention.

I claim:

1. A hood ornament mounting apparatus for a vehicle having a planar mounting surface, said apparatus comprising:

an ornament having a lower mounting loop;

an ornament base;

a tubular housing coupled to the ornament base;

a connecting rod removably affixed to the lower mounting loop;

a magnetized sliding disk affixed to a bottom end of the connecting rod;

a ferromagnetic lever pivotally affixed to the tubular housing;

said ferromagnetic lever comprising a locking arm projecting inside said tubular housing; and a spring means functioning to maintain the ornament in a mounted position by biasing the magnetized sliding disk between a planar mounting surface and the ferromagnetic lever, whereby lifting the ornament causes the ferromagnetic lever to pivot, thereby supporting the magnetized sliding disk in a raised position to enable the removal of the ornament.

2. The hood ornament mounting apparatus of claim 1 further comprising a perpendicular tube located on an outer wall of the tubular housing and a locking plunger fitting into the perpendicular tube.

3. The hood ornament mounting and ornament removal apparatus of claim 2 wherein the locking plunger is pushed into the tubular housing by a light spring and withdrawn from the tubular housing by a source of engine vacuum.

4. The hood ornament mounting apparatus of claim 3 further comprising a metal collar on the tubular housing, the metal collar being electrically connected to the locking plunger to electrically engage an alarm upon movement of the magnetized sliding disk into contact with the locking plunger.

5. The hood ornament mounting apparatus of claim 4 wherein the alarm is the vehicle horn.

6. The hood ornament mounting apparatus of claim 1 further comprising a metal collar on the tubular housing, the metal collar being electrically connected to a locking plunger which electrically engages an alarm upon movement of the disk magnet into contact with the locking plunger.

7. The hood ornament mounting apparatus of claim 1 wherein the connecting rod is attached to the magnetized sliding disk by threads.

8. The hood ornament mounting apparatus of claim 1 further comprising:

a centering washer located above the spring means;

a protective washer located below the spring means; and a rubber washer located below the protective washer and above the magnetized sliding disk.

9. The hood ornament mounting apparatus of claim 1 wherein the connecting rod has a lower threaded portion attached to an upper wire portion, the magnetized sliding disk has a threaded hole therein, and the lower threaded portion of the connecting rod is screwed into the threaded hole of the magnetized sliding disk.

10. An apparatus for mounting a hood ornament to and removing the hood ornament from an ornament base, the hood ornament having a lower mounting loop above an aperture in the ornament base, comprising:

a tubular housing attached to the ornament base;

a ferromagnetic lever pivotally mounted to the tubular housing, the ferromagnetic lever further comprising a locking arm projecting inside the tubular housing;

a connecting rod having an upper end removably attached to the mounting loop of the hood ornament;

a sliding disk;

means for attaching a lower end of the connecting connecting rod to the sliding disk; a disk magnet located above the sliding disk; and a spring above the disk magnet and below the aperture in the ornament base, the spring surrounding the connecting rod, whereby the sliding disk and disk magnet fit into the tubular housing and slide below the ferromagnetic locking arm when the ornament is mounted and slide above the ferromagnetic locking arm when the ornament is removed.

11. The apparatus for mounting a hood ornament to and removing the hood ornament from an ornament base of claim 10, further comprising means for locking the sliding disk and disk magnet in place when the hood ornament is mounted.

12. The apparatus for mounting a hood ornament to and removing the hood ornament from an ornament base of claim 11 wherein the means for locking is a locking plunger.

13. The apparatus for mounting a hood ornament to and removing the hood ornament from an ornament base of claim 12, further comprising a spring to insert the locking plunger and an engine vacuum hose connection adapted to withdraw the locking plunger when connected to engine vacuum.

14. The apparatus for mounting a hood ornament to and removing the hood ornament from an ornament base of claim 10 wherein the tubular housing is attached to the ornament base by complementary threads.

15. The apparatus for mounting a hood ornament to and removing the hood ornament from an ornament base of claim 10, further comprising means for triggering an alarm when the hood ornament is raised.

16. The apparatus for mounting a hood ornament to and removing the hood ornament from an ornament base of claim 10 further comprising means for triggering the vehicle horn when the ornament is raised.

17. The apparatus for mounting a hood ornament to and removing the hood ornament from an ornament base of claim 10, further comprising a centering washer above the spring and surrounding the connecting rod, a protective washer below the spring and surrounding the connecting rod, and a rubber washer below the protective washer and above the disk magnet, the rubber washer surrounding the connecting rod.

18. The apparatus for mounting a hood ornament to and removing the hood ornament from an ornament base of claim 10, wherein the means for attaching the connecting rod to the sliding disk comprises threads on the lower end of the connecting rod and a hole in the sliding disk with complementary threads.

* * * * *